(12) United States Patent
Zhou et al.

(10) Patent No.: US 8,787,160 B2
(45) Date of Patent: Jul. 22, 2014

(54) METHOD, APPARATUS, AND SYSTEM FOR JUDGING PATH CONGESTION

(75) Inventors: Weixue Zhou, Beijing (CN); Xushan Lu, Shenzhen (CN); Qian Zhou, Shenzhen (CN); Hao Wu, Beijing (CN); Pingan Yang, Beijing (CN); Huailong Gu, Shenzhen (CN); Ting Zou, Santa Clara, CA (US); Xiaobin Luo, Xian (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 315 days.

(21) Appl. No.: 13/333,740

(22) Filed: Dec. 21, 2011

(65) Prior Publication Data

US 2012/0092988 A1   Apr. 19, 2012

Related U.S. Application Data

(63) Continuation of application No. PCT/CN2009/072411, filed on Jun. 23, 2009.

(51) Int. Cl.

| | | |
|---|---|---|
| *G01R 11/00* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 12/26* | (2006.01) | |
| *H04L 12/28* | (2006.01) | |
| *H04L 12/56* | (2006.01) | |

(52) U.S. Cl.
CPC ........... *H04L 47/11* (2013.01); *H04L 47/115* (2013.01); *H04L 47/823* (2013.01)
USPC ..................................................... 370/230

(58) Field of Classification Search
None
See application file for complete search history.

(56) References Cited

U.S. PATENT DOCUMENTS

| | | |
|---|---|---|
| 2007/0058532 A1 | 3/2007 | Wadekar et al. |
| 2009/0116391 A1 | 5/2009 | Bakkar et al. |
| 2010/0091976 A1* | 4/2010 | Boucadair ............... 379/221.03 |

FOREIGN PATENT DOCUMENTS

| | | |
|---|---|---|
| CN | 1735239 A | 2/2006 |
| CN | 1863164 A | 11/2006 |
| EP | 1936880 A1 | 6/2008 |
| WO | WO 2008075029 A1 | 6/2008 |

OTHER PUBLICATIONS

Author Unknown, Congestion and Pre-Congestion, pp. 1-55, Jan. 2009.*

(Continued)

*Primary Examiner* — John Blanton
*Assistant Examiner* — Christopher Crutchfield
(74) *Attorney, Agent, or Firm* — Brinks Gilson & Lione

(57) ABSTRACT

The present disclosure relates to the field of communications, and discloses a method for determining path pre-congestion. The method is applicable to an Ethernet path. Pre-congestion is determined and flagged through an ingress node or an intermediate node in the Ethernet path, and a pre-congestion status indication packet is sent by an egress node to the ingress node or a policy server, so that the ingress node or the policy server obtains pre-congestion information of the Ethernet path, and notify an application function entity AF of performing admission control. When the method in the present disclosure is used, problems of packet loss and excessively long time delay caused by the conventional congestion control technology may be avoided, thereby ensuring user experience of existing services.

10 Claims, 11 Drawing Sheets

(56) References Cited

OTHER PUBLICATIONS

Communication issued in corresponding European Patent Application No. 09846356.5, mailed Sep. 27, 2012.
Office Action issued in corresponding Chinese Patent Application No. 200980113735.2, mailed Sep. 5, 2012.
Extended European Search Report issued in corresponding European Patent Application No. 09846356.5, mailed Feb. 9, 2012.
International Search Report issued in corresponding PCT Patent Application No. PCT/CN2009/072411, mailed Apr. 1, 2010.
Written Opinion of the International Searching Authority issued in corresponding PCT Patent Application No. PCT/CN2009/072411, mailed Apr. 1, 2010.
Briscoe et al., "A Framework for Admission Control over DiffServ using Pre-Congestion Notification" Internet Draft, Oct. 24, 2005.
Eardley, "Pre-Congestion Notification (PCN) Architecture" Notification Working Group, Mar. 16, 2009.
Telecommunication Standardization Sector, "Draft Recommendation Q.PCNApp Out of the May 2009 Meeting" Study Period 2009-2012. TD 156 (NGN-GSI), Geneva, May 11-22, 2009.
LAN MAN Standards Committee of the IEEE Computer Society, "Virtual Bridged Local Area Networks—Amendment: Congestion Notification" IEEE P802.1Qau/D2.1, Jun. 10, 2009.

\* cited by examiner

METHOD, APPARATUS, AND SYSTEM FOR JUDGING PATH CONGESTION

CROSS-REFERENCE TO RELATED APPLICATIONS

This application is a continuation of International Application No. PCT/CN2009/072411, filed on Jun. 23, 2009, which is hereby incorporated by reference in its entirety.

FIELD

The present disclosure relates to the field of communications, and in particular, to a method, an apparatus, and a system for determining path congestion.

BACKGROUND

A plurality of convergence nodes exist in the current network, and a great number of service streams converge at the convergence nodes, causing that congestion may occur in the convergence nodes, so how to control the network congestion effectively becomes an urgent problem to be solved.

In the prior art, the problem above is usually solved by sending a traffic control frame or discarding a packet. For example, when congestion occurs in a certain Ethernet switch in the Ethernet, the current Ethernet switch sends a traffic control frame to an upper level Ethernet switch, and the upper level Ethernet switch performs traffic control process. Specifically, the upper level Ethernet switch reduces a rate of sending data to the current Ethernet switch in a certain period of time to avoid congestion. At this time, the current Ethernet switch may further discard an Ethernet packet in a priority scheduling mode and/or in a random mode.

During the implementation of the present disclosure, the inventor of the present disclosure finds that the prior art at least has the following problems. The upper level Ethernet switch reduces the rate of sending data to the current Ethernet switch to avoid congestion, causing that a transmission time delay of the existing service stream becomes congestion, causing that a transmission time delay of the existing service stream becomes longer; and the current Ethernet switch discards the Ethernet packet to avoid congestion, causing that packet loss occurs to the existing service stream. Therefore, the prior art is not applicable to a real-time service. For example, for a video service, the video becomes not smooth or encounters mosaics, thus directly affecting user experience of the video service. Therefore, the prior art is seldom adopted.

SUMMARY

The objective of present disclosure is to provide a method for determining path congestion, so as to ensure user experience of existing services when congestion occurs in an Ethernet.

The objective of the present disclosure is achieved through the following solutions.

A method for determining path congestion is applicable to an Ethernet path. An egress node in the Ethernet path receives an Ethernet packet; determines whether the egress node changes a current pre-congestion status, where the current pre-congestion status includes the status that a pre-congestion occurs and the status that the pre-congestion does not occur When the current pre-congestion status is changed, a pre-congestion status indication packet is generated. The pre-congestion status indication packet includes a path identifier of the Ethernet path; and the pre-congestion status indication packet is sent to an ingress node or a policy server to perform admission control. In addition, when a pre-congestion flag is carried in the Ethernet packet received by the egress node, the pre-congestion flag is deleted.

A method for processing path congestion is applicable to a policy server in an Ethernet. The policy server performs admission control according to pre-congestion information of the Ethernet, which is: receiving a pre-congestion status indication packet or notification of another node in other format; obtaining pre-congestion information of an Ethernet path; and notifying an application function entity (AF) of performing admission control.

A method for determining path congestion is applicable to an Ethernet path.

An ingress node or an intermediate node in an Ethernet path determines whether pre-congestion occurs in the node after receiving an Ethernet packet, sets a pre-congestion flag in the Ethernet packet if the pre-congestion occurs, and sends the Ethernet packet.

An apparatus for determining path congestion, where the apparatus is located in an Ethernet path, includes: an Ethernet ingress port, configured to receive an Ethernet packet; a pre-congestion determining module, configured to determine whether pre-congestion occurs in an Ethernet node after the Ethernet ingress port receives the Ethernet packet; and a pre-congestion flag determining module, configured to determine whether a pre-congestion flag is carried in the Ethernet packet after the Ethernet ingress port receives the Ethernet packet.

When the apparatus is an ingress node or an intermediate node in the Ethernet path, the apparatus further includes: a pre-congestion flag module, configured to set the pre-congestion flag in the Ethernet packet when the pre-congestion determining module determines that the pre-congestion occurs in the ingress node or the intermediate node; and an Ethernet egress port, configured to send the Ethernet packet.

When the apparatus is an egress node in the Ethernet path, the apparatus further includes: a pre-congestion status storage module, configured to store a pre-congestion status of the Ethernet path; a pre-congestion status changing module, configured to query the pre-congestion status stored in the pre-congestion status storage module, determine whether to change the pre-congestion status, and change the pre-congestion status; a pre-congestion status indication packet generating unit, configured to generate the pre-congestion status indication packet when the pre-congestion status changing module determines that the egress node changes the pre-congestion status, where the pre-congestion status indication packet includes a path identifier of the Ethernet path; and an Ethernet egress port, configured to send the pre-congestion status indication packet.

A policy server, where the policy server is located in an Ethernet, includes: an Ethernet ingress port, configured to receive a pre-congestion status indication packet; and a notification module, configured to notify an AF of performing admission control after the Ethernet ingress port receives the pre-congestion status indication packet.

A system for determining path congestion includes at least one Ethernet path. Each Ethernet path includes the apparatus for determining path congestion as an ingress node, the apparatus for determining path congestion as an intermediate node, and the apparatus for determining path congestion as an egress node.

In the solutions according to the present disclosure, the ingress node or the intermediate node in the Ethernet path determines and flags the pre-congestion; the egress node determines whether to change the current pre-congestion status and generates the pre-congestion status indication packet; and the ingress node or the policy server in the Ethernet receives the pre-congestion status indication packet to perform admission control, thereby solving problems of excessively long time delay and packet loss of the existing service stream in the prior art, so that an effect of realizing congestion control without affecting the user experience of the existing services is achieved.

DETAILED DESCRIPTION OF THE EMBODIMENTS

Figure 1:
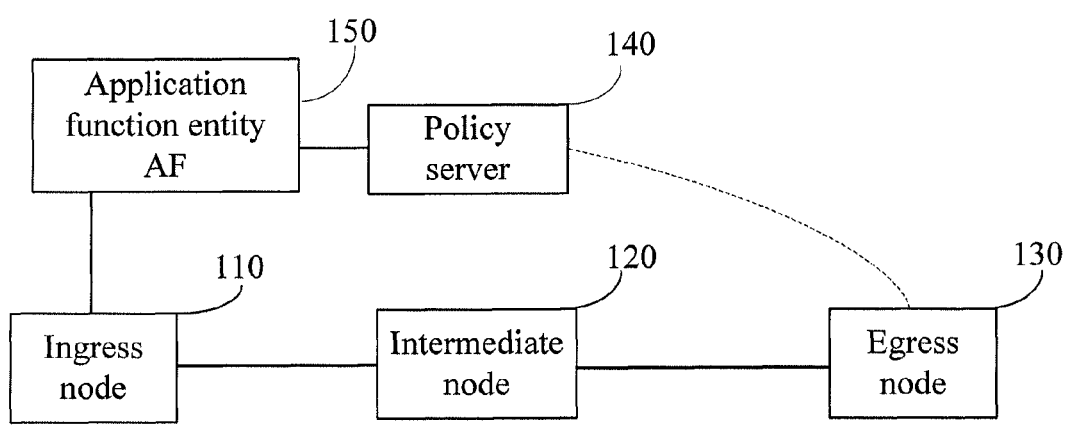
FIG. 1 is a schematic diagram of networking according to an embodiment of the present disclosure.

In order to make the objective, the solutions and the advantages of the present disclosure more comprehensible, the following illustrates the present disclosure in further detail with reference to embodiments and accompanying drawings. It should be understood that, embodiments to be described here are only for interpreting the present disclosure, and are not intended to limit the present disclosure.

To facilitate illustrations, a specific embodiment of the present disclosure is introduced in the following. An example shown in FIG. 1 includes an ingress node 110, an intermediate node 120, an egress node 130, an application function entity 150, and a policy server 140. The ingress node 110, the intermediate node 120, and the egress node 130 are nodes in an Ethernet path respectively, and the dash line is a path of feeding back a pre-congestion status indication packet by the egress node 130. A method for determining path pre-congestion is specifically introduced in the following.

The ingress node 110 or the intermediate node 120 determines whether pre-congestion occurs in the ingress node 110 or the intermediate node 120 after receiving an Ethernet packet, sets a pre-congestion flag is set in the Ethernet packet if the pre-congestion occurs in the ingress node 110 or the intermediate node 120, and sends the Ethernet packet.

The egress node 130 receives the Ethernet packet, and determines whether the egress node 130 changes a current pre-congestion status. The current pre-congestion status includes the status that a pre-congestion occurs and the status that the pre-congestion does not occur. When the current pre-congestion status is changed, a pre-congestion status indication packet is generated. The pre-congestion status indication packet includes a path identifier of the Ethernet path, and the pre-congestion status indication packet is sent to the ingress node 110 or the policy server 140 to perform admission control.

In order to make this embodiment clearer, the following describes the method for determining path pre-congestion in the embodiment in detail through the ingress node 110, the intermediate node 120, and the egress node 130, respectively.

Figure 2:
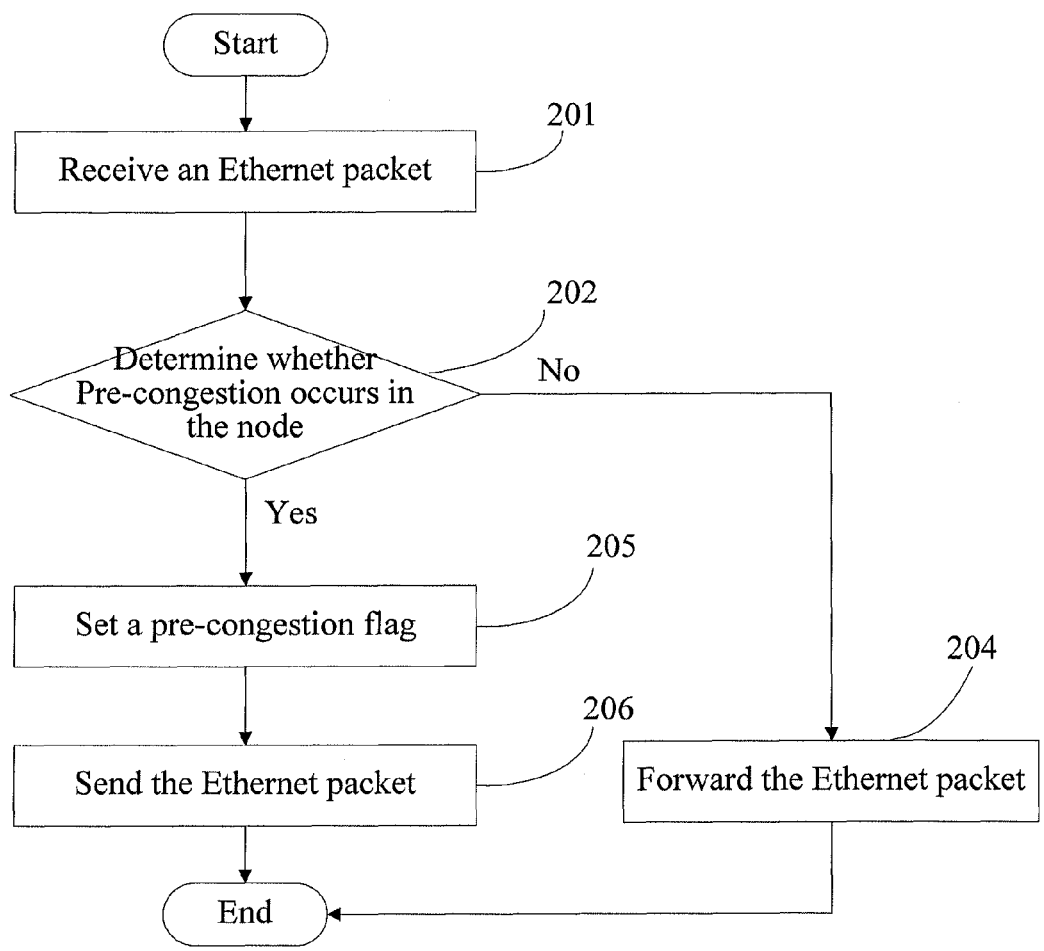
FIG. 2 is a flow chart of a method for determining path pre-congestion by an ingress node or an intermediate node according to an embodiment of the present disclosure.

A specific processing flow of the ingress node 110 in above embodiment is as shown in FIG. 2.

201: Receive an Ethernet packet.

202: Determine whether pre-congestion occurs in the ingress node 110, which may be implemented as follows. Collect statistics about a value of data traffic of the ingress node 110, and determine whether the value of the data traffic of the ingress node 110 is greater than a first threshold. If the statistical value of the data traffic is greater than a first threshold, the pre-congestion occurs; if the statistical value of the data traffic is smaller than the first threshold, the pre-congestion does not occur; when the statistical value of the data traffic is equal to the first threshold, it may be considered that the pre-congestion occurs or the pre-congestion does not occur, which may be determined through configuration according to situations.

204: If the pre-congestion does not occur in the ingress node 110, forward the received Ethernet packet to the intermediate node 120. The operation of the ingress node 110 ends.

205: If the pre-congestion occurs in the ingress node 110, set a pre-congestion flag in the Ethernet packet.

The pre-congestion flag may be set in the Ethernet packet in the following modes.

Figure 6:
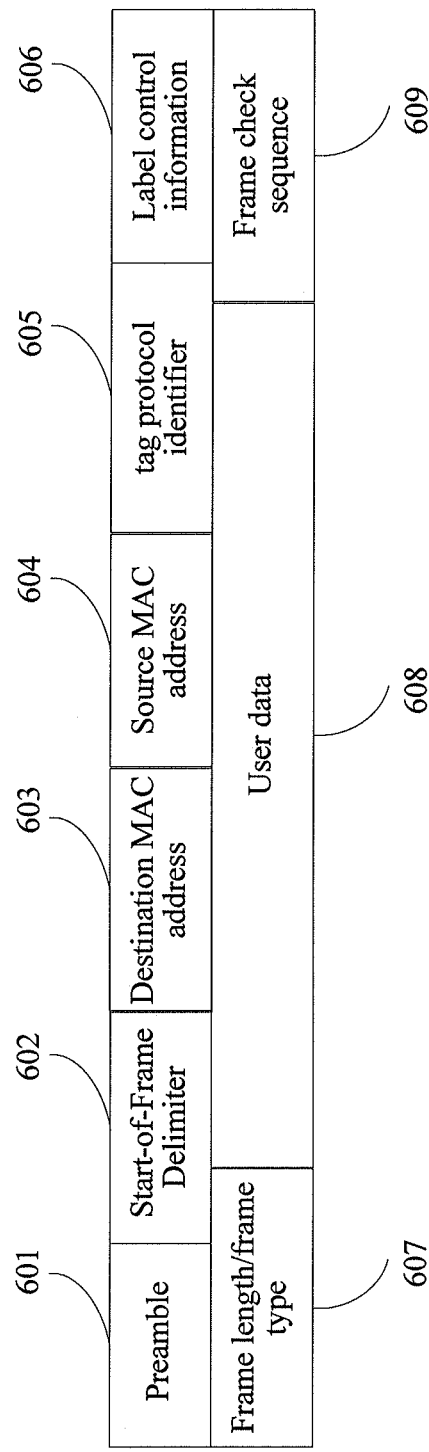
FIG. 6 is a schematic diagram of a format of an Ethernet packet according to an embodiment of the present disclosure.
Figure 7:
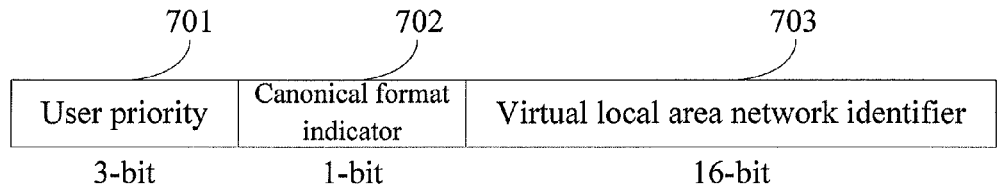
FIG. 7 is a schematic diagram of a label control information field 606 of an Ethernet packet according to an embodiment of the present disclosure.

A format of an Ethernet 802.1Q packet is as shown in FIG. 6, which includes fields such as a preamble 601, a Start-of-Frame Delimiter 602, a destination Media Access Control (MAC) address 603, a source MAC address 604, a tag protocol identifier 605, label control information 606, a frame length/frame type 607, user data 608, and a frame check sequence 609. A specific format of the label control information field 606 in the format of the Ethernet 802.1Q packet is as shown in FIG. 7, which includes a user priority 701, a canonical format indicator 702, and a virtual local area network identifier 703. For definitions of the above fields, reference may be made to the definitions in 802.1Q standard.

A value of the canonical format indicator CFI field 702 in FIG. 7 is set to a specific value, for example, 1.

Alternatively, the user priority field 701 in FIG. 7 is set to a specific value. For example, the priority in the 802.1Q protocol includes 0 to 7, and the highest priority 6 or 7 may be adopted as the pre-congestion flag, that is, a 3-bit field of the priority is set to 110 or 111. The above only takes 6 or 7 as an example for illustration. During practical networking, different operators may designate the specific value according to rules inside the networks of their own.

206: Send the Ethernet packet to the egress node 130, and send the Ethernet packet to the intermediate node 120, where the pre-congestion flag set in step 205 is carried in the Ethernet packet.

After finding the pre-congestion, the ingress node 110 sends the Ethernet packet carrying the pre-congestion flag to the egress node 130 without sending a traffic control frame to an upper level node. A plurality of upper level nodes may exist at the same time, so a problem that a service bandwidth is occupied may be caused when the traffic control frame is sent to the upper level nodes. In the embodiment of the present disclosure, the Ethernet packet is only sent to the egress node 130, and only one egress node 130 exists, so the problem of bandwidth waste is avoided when the Ethernet packet is sent to the plurality of other nodes, thereby effectively saving the bandwidth.

Further, the intermediate node 120 in the embodiment of the present disclosure notifies the pre-congestion status by setting the pre-congestion flag in an existing Ethernet packet bearing the service data, and the dedicated traffic control frame is not needed, thereby avoid bandwidth waste.

Figure 3:
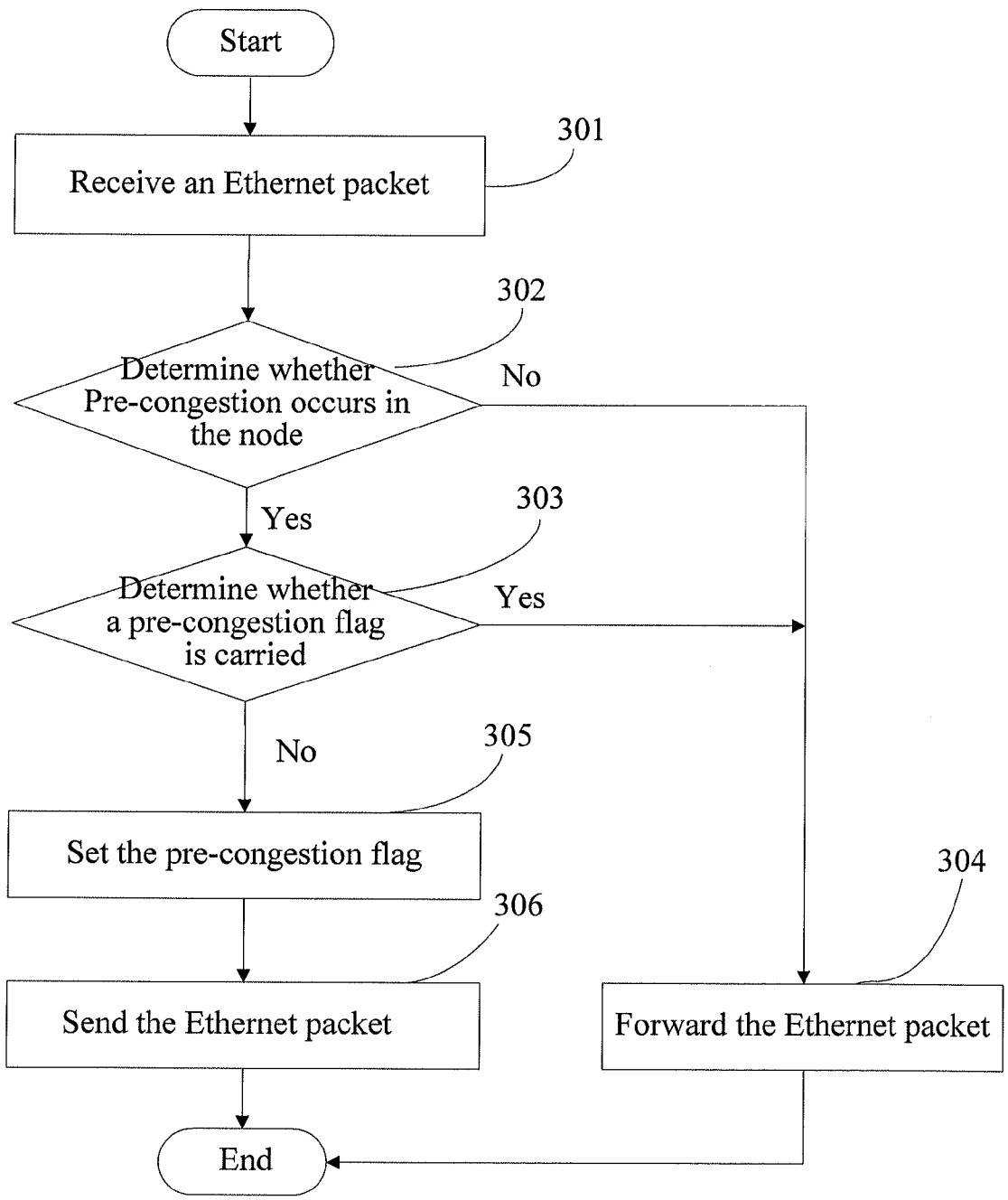
FIG. 3 is a flow chart of a method for determining path pre-congestion by an intermediate node according to an embodiment of the present disclosure.

A specific processing process of the intermediate node 120 in the embodiment is as shown in FIG. 3. Processing actions of the intermediate node 120 are the same as the actions of the ingress node 110. The difference is that, on the basis of all the actions of the ingress node 110, the intermediate node 120 further determines whether the pre-congestion flag is carried in the Ethernet packet from the ingress node 110. That is, the intermediate node 120 may only determine whether the pre-congestion occurs in the intermediate node 120, or the intermediate node 120 may also determine whether the pre-congestion occurs in the intermediate node 120 and whether the pre-congestion flag is carried in the Ethernet packet from the ingress node 110. When the intermediate node 120 only determines whether the pre-congestion occurs in the current node, the actions are the same as the actions of the ingress node 110, which are not repeated here.

The specific operation steps when the intermediate node 120 determines whether the pre-congestion occurs in the current node, and determines whether the pre-congestion flag is carried in the Ethernet packet from the ingress node 110 are introduced in detail below.

During the specific implementation that the intermediate node 120 determines whether the pre-congestion occurs in the intermediate node 120 and determines whether the pre-congestion flag is carried in the Ethernet packet, the intermediate node 120 may first determine whether the pre-congestion occurs, or may first determine whether the pre-congestion flag is carried in the Ethernet packet, and the sequence is not limited. The two modes are introduced in the following respectively.

A specific operation for first determining whether the pre-congestion occurs and then determining whether the pre-congestion flag is carried in the Ethernet packet is as shown in FIG. 3, in which 301, 304, 305, and 306 are the same as 201, 204, 205, and 206 in FIG. 2, respectively, so the description is not repeated. 302 and 303 are introduced in detail below. In 302, it is determined whether the pre-congestion occurs in the intermediate node 120, which is the same as 202 in FIG. 2. If the pre-congestion does not occur in the intermediate node 120, the process turns to step 304. If the pre-congestion occurs in the intermediate node 120, the process turns to step 303.

In step 303, it is determined whether a pre-congestion flag is carried in the received Ethernet packet, that is, it is determined whether the pre-congestion flag set in step 205 is carried in the Ethernet packet. Specifically, it is determined whether the canonical format indicator CFI field of 802.1Q protocol in the Ethernet packet is the specific value (1) set in step 205 or it is determined whether the priority field of 802.1Q protocol in the Ethernet packet is the specific value (6 or 7) set in step 205. If the pre-congestion flag exists in the received Ethernet packet, the process turns to step 304. If the pre-congestion flag is not carried in the received Ethernet packet, the process turns to step 305.

Figure 4:
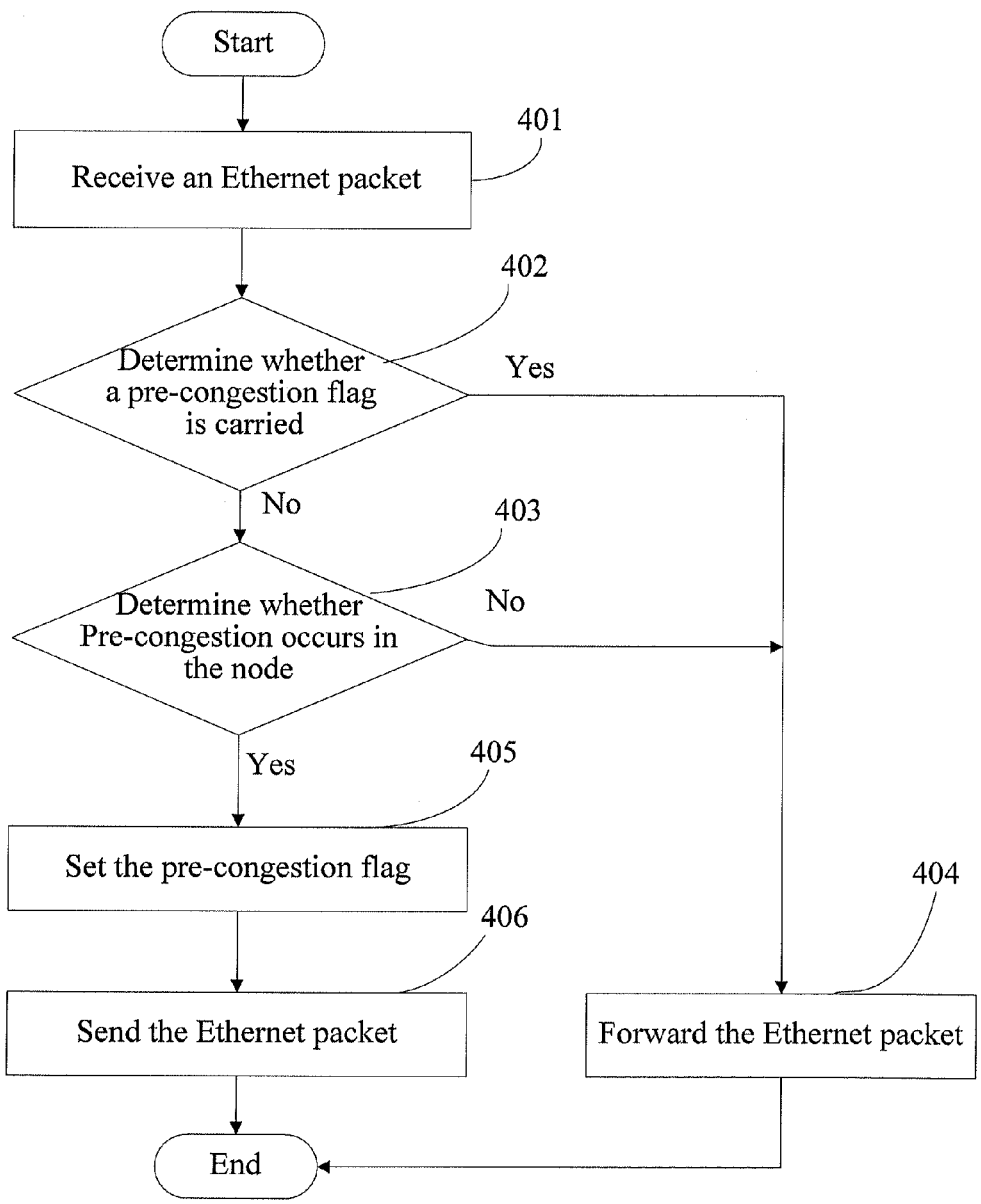
FIG. 4 is a flow chart of another method for determining path pre-congestion by an intermediate node according to an embodiment of the present disclosure.

A specific operation for first determining whether the pre-congestion flag is carried in the Ethernet packet and then determining whether the pre-congestion occurs is as shown in FIG. 4, in which 401, 404, 405, and 406 are the same as 201, 204, 205, and 206 in FIG. 2, respectively, so the description is not repeated. 402 and 403 are introduced in detail below. In 402, it is determined whether the pre-congestion flag is carried in the received Ethernet packet, which is the same as 303 in FIG. 3. If the pre-congestion flag exists in the received Ethernet packet, the process turns to step 404. If the pre-congestion flag is not carried in the received Ethernet packet, the process turns to step 403, where it is determined whether the pre-congestion occurs in the intermediate node 120. Step 403 is the same as 202 in FIG. 2. If the pre-congestion occurs in the intermediate node 120, the process turns to step 405. If the pre-congestion does not occur in the intermediate node 120, the process turns to step 404.

After the pre-congestion occurs in the intermediate node 120, the intermediate node 120 sends the Ethernet packet carrying the pre-congestion flag to the egress node 130 without sending a traffic control frame to an upper level node. A plurality of upper level nodes may exist at the same time, so a problem that a service bandwidth is occupied may be caused when the traffic control frame is sent to the upper level nodes. In the embodiment of present disclosure, the Ethernet packet is only sent to the egress node 130, and only one egress node 130 exists, so the problem of bandwidth waste is avoided when the Ethernet packet is sent to the plurality of other nodes is avoided, thereby effectively saving the bandwidth. Further, the intermediate node 120 in the embodiment of present disclosure notifies the pre-congestion status by setting the pre-congestion flag in the existing Ethernet packet bearing the service data, and the dedicated traffic control frame is not needed, thereby avoiding bandwidth waste.

Figure 5:
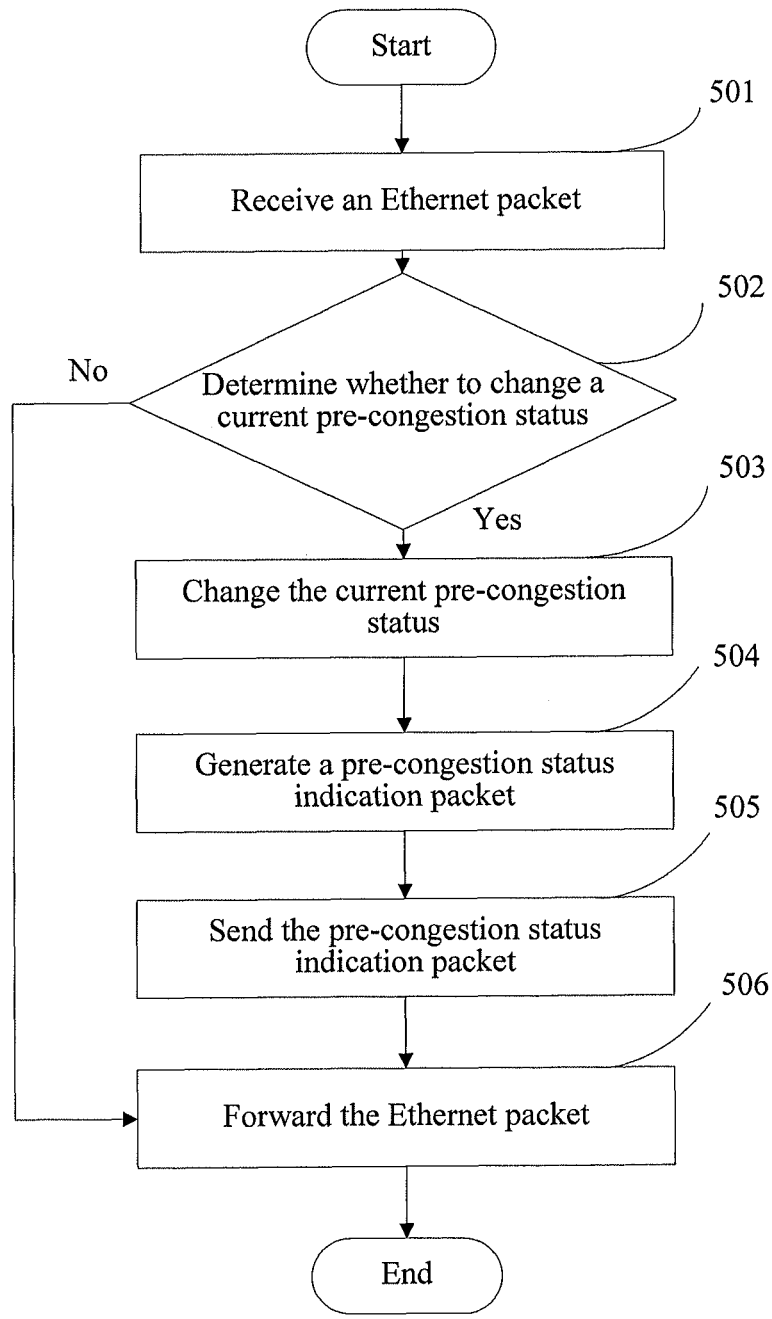
FIG. 5 is a flow chart of a method for determining path pre-congestion by an egress node according to an embodiment of the present disclosure.

A specific processing process of the egress node 130 in the embodiment is as shown in FIG. 5, which includes the following.

501: Receive an Ethernet packet.

502: Determine whether to change the current pre-congestion status. The current pre-congestion status includes the status that the pre-congestion occurs and the status that the pre-congestion does not occur. Two situations that the status that the pre-congestion does not occur and the status that the pre-congestion occurs are changed to each other are respectively introduced below.

When the pre-congestion status is the status that the pre-congestion occurs, it is determined whether the pre-congestion occurs in the egress node 130 and whether the pre-congestion flag is carried in the Ethernet packet. When the pre-congestion does not occur in the egress node 130, and the pre-congestion flag is not carried in the Ethernet packet, the process turns to step 503 to change the current pre-congestion status. Accordingly, the changing the current pre-congestion status is specifically that the status that the pre-congestion status occurs is changed to the status that the pre-congestion does not occur. The pre-congestion status indication packet indicates that the pre-congestion does not occur in the Ethernet path.

When the pre-congestion status is the status that the pre-congestion does not occur, it is determined whether the pre-congestion occurs in the egress node 130 and whether the pre-congestion flag is carried in the Ethernet packet. When the pre-congestion occurs in the egress node 130 or the pre-congestion flag is carried in the Ethernet packet, the process turns to step 503 to change the current pre-congestion status. Accordingly, the changing the current pre-congestion status is specifically that the status that the pre-congestion does not occur is changed to the status that the pre-congestion occurs. The pre-congestion status indication packet indicates that the pre-congestion occurs in the Ethernet path.

503: Change the current pre-congestion status from the status that the pre-congestion does not occur into the status that the pre-congestion occurs, or from the status that the pre-congestion occurs into the status that the pre-congestion does not occur.

504: Generate the pre-congestion status indication packet. Specifically, when the current pre-congestion status is changed, the pre-congestion status indication packet is generated. The pre-congestion status indication packet respectively indicates the status that the pre-congestion occurs and the status that pre-congestion does not occur.

The pre-congestion status indication packet includes an Ethernet 802.1Q protocol packet and a common open policy service COPS protocol packet.

Figure 8:
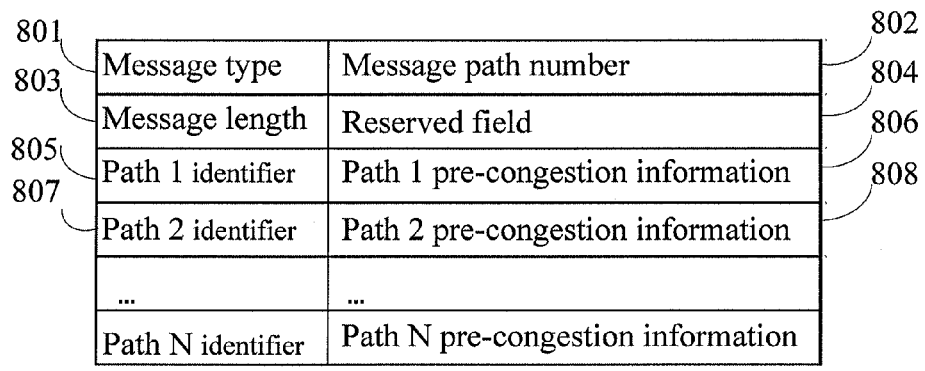
FIG. 8 is a schematic diagram of a user data field 608 of a pre-congestion status indication packet according to an embodiment of the present disclosure.

When the pre-congestion status indication packet is the 802.1Q protocol packet shown in FIG. 6, a management virtual local area network identifier is born in the virtual local area network identifier field 703 shown in FIG. 7, and the user data field 608 shown in FIG. 6 is used to bear pre-congestion status information. The user data field 608 may represent the pre-congestion information in a plurality of modes, for example, a representation mode shown in FIG. 8 may be adopted, which is specifically as follows.

A message type 801 is configured to represent that the packet delivers the pre-congestion status information.

A message path number 802 is configured to represent an amount of path information fed back by the packet.

A message length 803 is configured to represent the number of bytes of the message.

A reserved field 804 is a field for other purposes.

A path 1 identifier 805, a path 2 identifier 807, . . . , and a path N identifier are configured to represent the identifier of the Ethernet path.

Path 1 pre-congestion information 806 represents a pre-congestion status of the first Ethernet path, for example, 0 represents that the pre-congestion does not occur, and 1 represents that the pre-congestion occurs.

Accordingly, path N pre-congestion information represents a pre-congestion status of the Nth Ethernet path.

The defined format of the user data field 608 is not limited to a specific format, and the pre-congestion information may be represented in a plurality of modes.

The egress node 130 sends the pre-congestion status indication packet to the policy server 140, which specifically further includes the following modes.

Figure 9:
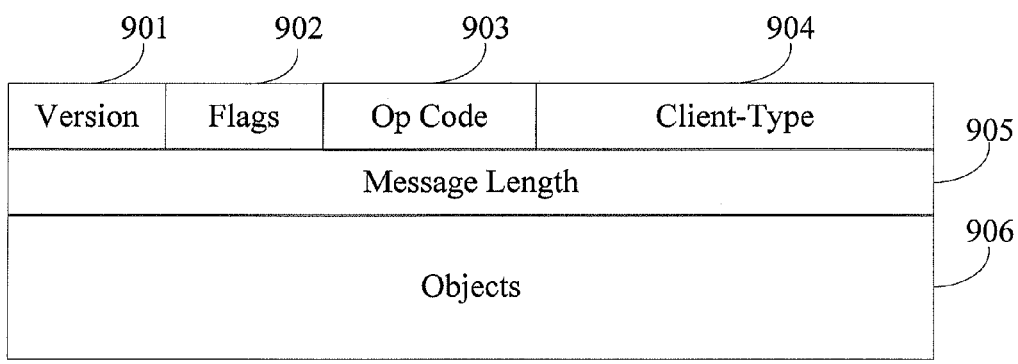
FIG. 9 is a schematic diagram of a format of a common open policy service protocol packet according to an embodiment of the present disclosure.

The pre-congestion status indication packet may be the common open policy service COPS protocol packet shown in FIG. 9.

The pre-congestion status information is delivered by adopting the common open policy service COPS protocol packet. The COPS protocol packet is as shown in FIG. 9, and the COPS protocol packet includes a COPS protocol header 901-905 and an encapsulation object 906.

The COPS protocol header includes the following.

A version number (Version) 901 designates a COPS version number, and a current version number is 1.

A flag value (Flags) 902 designate s that a flag value is 1, which is a request information flag bit.

An operation code (Op Code) 903 is configured to identify a COPS operation.

A client-type (Client-Type) 904 is configured to identify a policy client, and the explanation of all the encapsulation objects is related to the Client-Type.

A message length (Message Length) 905 is length of information, which includes the lengths of standard COPS header and all the encapsulation objects.

Figure 10:
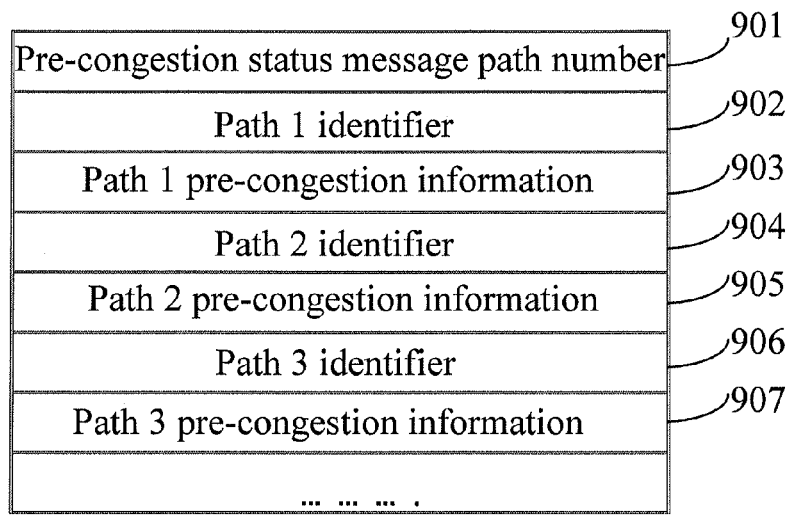
FIG. 10 is a schematic diagram of an encapsulation object 906 of another pre-congestion status indication packet according to an embodiment of the present disclosure.

An encapsulation object (Objects) 906 is self-defined pre-congestion status information. The encapsulation object field 906 is configured to bear the pre-congestion status information, and the encapsulation object field 906 may represent the pre-congestion information in a plurality of modes, for example, a representation mode shown in FIG. 10 may be adopted, which is specifically as follows.

A pre-congestion status message path number 901 is configured to represent an amount of path information fed back by the packet.

A path 1 identifier 902, a path 2 identifier 904, a path 3 identifier 906, . . . , and a path N identifier are configured to represent the identifier of the Ethernet path. Path 1 pre-congestion information 903 represents pre-congestion information of an Ethernet path 1, for example, 0 represents that the pre-congestion does not occur, and 1 represents that the pre-congestion occurs.

Accordingly, path N pre-congestion information represents a pre-congestion status of the Nth Ethernet path.

The self-defined encapsulation object field is not limited to a specific definition mode.

An sequence of performing step 503 and step 504 is not limited.

505: Send the pre-congestion status indication packet to the policy server 140 or the ingress node 110, so that the policy server 140 or the ingress node 110 notifies the application function entity AF 150 of performing admission control. When the pre-congestion status indication packet is sent to the ingress node 110, the pre-congestion status indication packet may be sent through the original Ethernet path, or through other paths, which is not limited in the embodiment of the present disclosure.

Optionally, the egress node 130 may further perform the following action. 506: When it is determined that the pre-congestion flag is carried in the Ethernet packet, delete the pre-congestion flag in the Ethernet packet first, and then forward the Ethernet packet; and alternatively, when it is determined that the pre-congestion flag is not carried in the Ethernet packet, forward the Ethernet packet directly.

Therefore, after forwarding the Ethernet packet, the egress node 130 determines whether to change the current pre-congestion status, and the egress node 130 changes the current pre-congestion status and sends the pre-congestion status indication packet, so that the ingress node 110 or the policy server 140 performs admission control after obtaining the congestion information of the Ethernet path.

In the embodiment of the present disclosure, only the egress node 130 sends the pre-congestion status indication packet, and the ingress node 110 and the intermediate node 120 do not need to send the pre-congestion status indication packet.

In the embodiment of the present disclosure, after the Ethernet packet carrying the pre-congestion flag is received, the egress node 130 determines whether to change the current pre-congestion status through the comparison with the current pre-congestion status. Only when the current pre-congestion status is changed, the egress node 130 sends the pre-congestion status indication packet to the ingress node 110 or the policy server 140 without sending the pre-congestion status indication packet every time when the Ethernet packet carrying the pre-congestion flag is received, thereby reducing the number of the sent pre-congestion status indication packets, and saving the bandwidth.

In the embodiment of the present disclosure, the egress node 130 sends the pre-congestion status indication packet to the ingress node 110 or the policy server 140, so that the ingress node 110 or the policy server 140 performs admission control. The admission control does not reduce a sending rate, and when the Ethernet packets need to be discarded, only the Ethernet packets of the new service streams are discarded, thereby ensuring that the Ethernet packets of the existing service streams are normally processed. The Ethernet packets are not discarded in a priority scheduling mode and/or in a random mode, so as to effectively ensure user experience of the existing service streams. Therefore, the present disclosure is particularly applicable to real-time service.

Further, after receiving the pre-congestion status indication packet, the policy server 140 or the ingress node 110 notifies the application function entity AF 150 of performing admission control.

The policy server 140 or the ingress node 110 notifies the application function entity 150 of performing admission control, which may specifically include the following modes.

The ingress node 110 is made to stop admitting new services, or to terminate a part of real-time services, thereby ensuring quality of service of most of the real-time services.

In the embodiment, the pre-congestion status indication packet may be received through the ingress node 110, so that policy server 140 is not essential.

The policy server 140 or the ingress node 110 may also receive a pre-congestion status indication packet of nodes other than the egress node 130 or a pre-congestion status indication packet in other formats.

In the embodiment of the present disclosure, after receiving the pre-congestion status indication packet, the policy server 140 or the ingress node 110 performs admission control without reducing the sending rate, and when the Ethernet packets need to be discarded, the Ethernet packets are selected to be discarded according to the service streams, that is, the Ethernet packets of the new service streams or a part of the existing service streams are discarded, thereby ensuring that the Ethernet packets of most of the existing service streams are normally processed. The Ethernet packets are not discarded in the priority scheduling mode and/or in the random mode, so as to solve problem of excessively long time delay and packet loss of the existing service streams resulting from the prior art, thereby effectively ensuring the user experience of existing services. Therefore, the present disclosure is particularly applicable to the real-time service.

In the present disclosure, the path specifically includes a virtual local area network VLAN path, and the types of the transmitted service streams on the path are not limited. The transmitted service streams may be a video service stream, a voice service stream, and a data service.

The number of the intermediate nodes 120 is not limited in the Ethernet path shown in FIG. 1. A plurality of intermediate nodes 120 may be included on one Ethernet path, and each intermediate node 120 sends the Ethernet packet or forwards the received Ethernet packet to a next hop node of the node.

Figure 11:
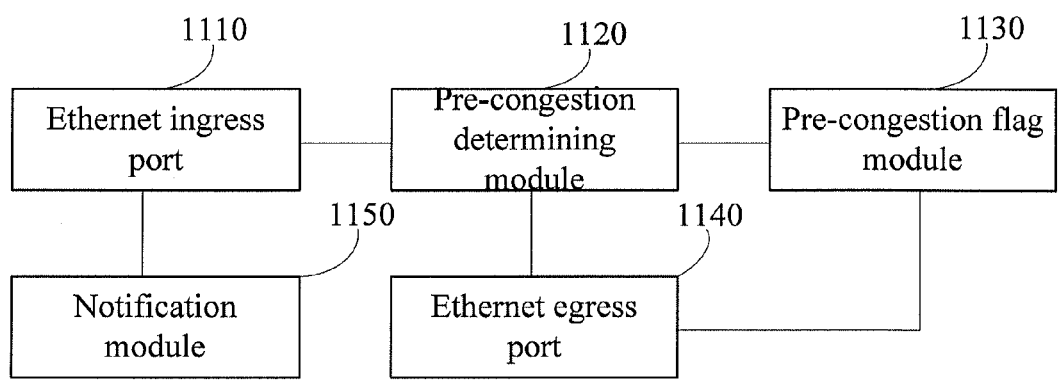
FIG. 11 is a schematic diagram of an ingress node apparatus according to an embodiment of the present disclosure.

The ingress node 110, the intermediate node 120, and the egress node 130 in the embodiment of the present disclosure may be Ethernet devices, and may also be any other network devices having an Ethernet changing function module. In addition, the ingress node 110, the intermediate node 120, and the egress node 130 in the embodiment of the present disclosure refer to network devices having a function of determining path pre-congestion in the embodiment of the present disclosure. An embodiment of the present disclosure further provides an apparatus for determining path congestion, where the apparatus is located in an ingress node 110 in an Ethernet path. As shown in FIG. 11, the apparatus specifically includes the following.

An Ethernet ingress port 1110 is configured to receive an Ethernet packet.

The Ethernet ingress port 1110 is further configured to receive a pre-congestion status indication packet. Accordingly, as shown in FIG. 11, the apparatus further includes a notification module 1150, which is configured to notify an application function entity AF 150 of performing admission control after the Ethernet ingress port 1110 receives the pre-congestion status indication packet.

A pre-congestion determining module 1120 is configured to determine whether pre-congestion occurs in ingress node 110 after the Ethernet packet is received.

A pre-congestion flag module 1130 is configured to set a pre-congestion flag in the Ethernet packet when the pre-congestion determining module 1120 determines that pre-congestion occurs in the ingress node 110.

An Ethernet egress port 1140 is configured to send the Ethernet packet.

When the pre-congestion determining module 1120 determines that the pre-congestion does not occur in the ingress node 110, the Ethernet egress port 1140 is further configured to forward the Ethernet packet.

Figure 12:
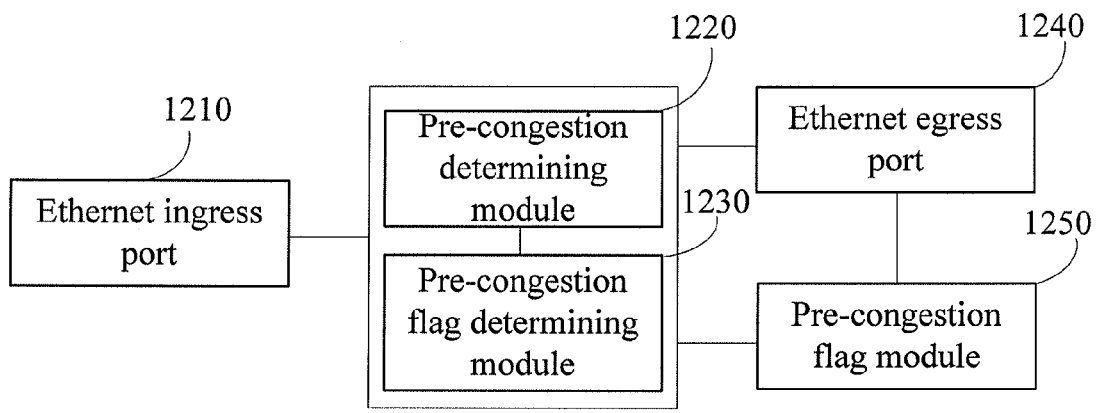
FIG. 12 is a schematic diagram of an intermediate node apparatus according to an embodiment of the present disclosure.

An embodiment of the present disclosure further provides an apparatus for determining path congestion, where the apparatus is located in an intermediate node 120 in an Ethernet path. As shown in FIG. 12, the apparatus specifically includes:

an Ethernet ingress port 1210, configured to receive an Ethernet packet;

a pre-congestion determining module 1220, configured to determine whether pre-congestion occurs in the intermediate node 120 after the Ethernet packet is received;

a pre-congestion flag determining module 1230, configured to determine whether a pre-congestion flag is carried in the Ethernet packet after the Ethernet packet is received;

a pre-congestion flag module 1250, configured to set the pre-congestion flag in the Ethernet packet when the pre-congestion determining module 1220 determines that the pre-congestion occurs in the node; and an Ethernet egress port 1240, configured to send the Ethernet packet.

When the pre-congestion determining module 1220 determines that the pre-congestion does not occur in the intermediate node 120, the Ethernet egress port 1240 is further configured to forward the Ethernet packet.

In the embodiment, the pre-congestion flag determining module 1230 is optional.

Figure 13:
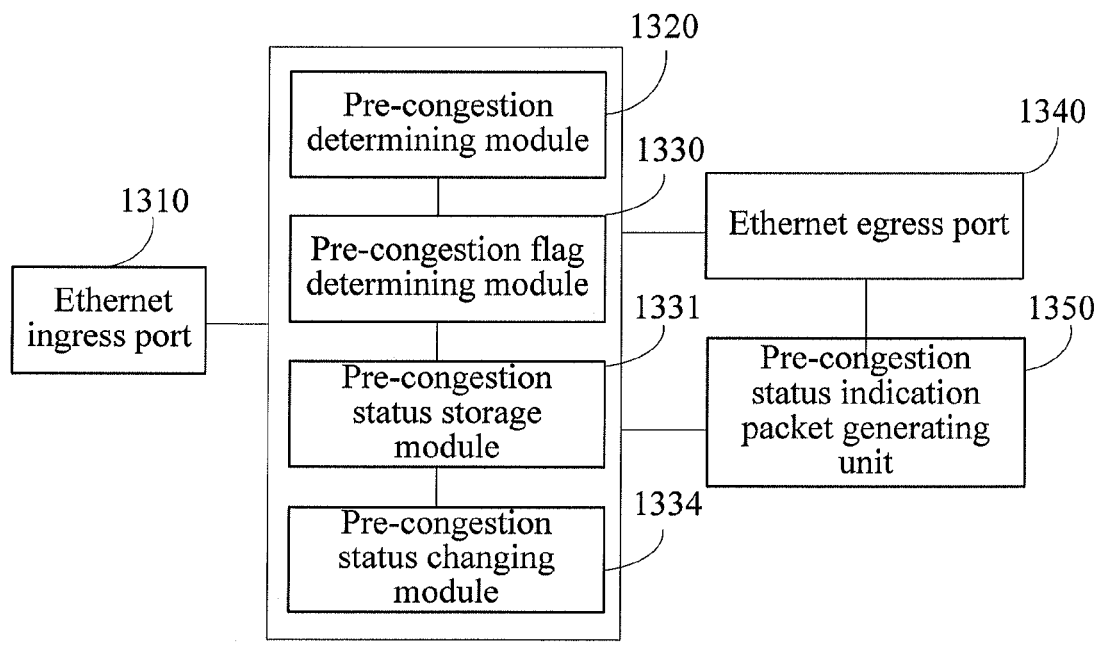
FIG. 13 is a schematic diagram of an egress node apparatus according to an embodiment of the present disclosure.

An embodiment of the present disclosure further provides an apparatus for determining path congestion, where the apparatus is located in an egress node 130 in an Ethernet path. As shown in FIG. 13, the apparatus specifically includes:

an Ethernet ingress port 1310, configured to receive an Ethernet packet;

a pre-congestion determining module 1320, configured to determine whether pre-congestion occurs in the egress node 130 after the Ethernet packet is received;

a pre-congestion flag determining module 1330, configured to determine whether a pre-congestion flag is carried in the Ethernet packet after the Ethernet packet is received;

a pre-congestion status storage module 1331, configured to store pre-congestion status information of the Ethernet path;

a pre-congestion status changing module 1334, configured to determine whether to change a current pre-congestion status, and change the current pre-congestion status;

a pre-congestion status indication packet generating unit 1350, configured to generate a pre-congestion status indication packet when the pre-congestion status changing module 1334 determines that the egress node 130 changes the current pre-congestion status, where the pre-congestion status indication packet includes a path identifier of the Ethernet path; and an Ethernet egress port 1340, configured to send the pre-congestion status indication packet.

Figure 15:
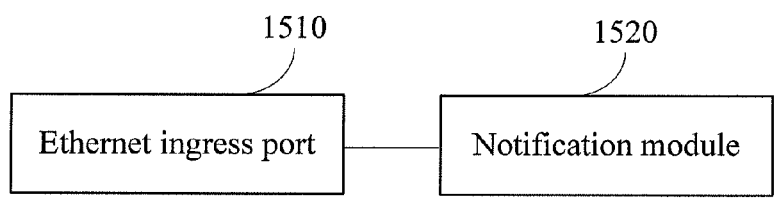
FIG. 15 is a schematic diagram of a policy server according to an embodiment of the present disclosure.
Figure 16:
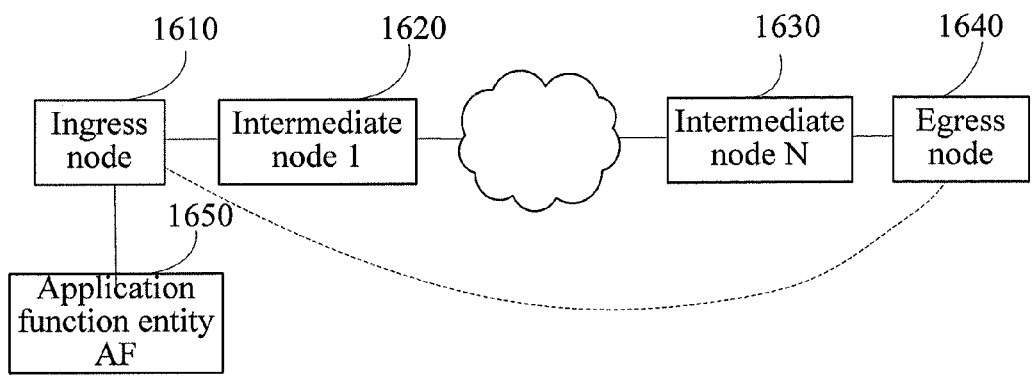
FIG. 16 is a schematic diagram of a system according to an embodiment of the present disclosure.

An embodiment of the present disclosure further provides a system for determining path congestion. As shown in FIG. 15 or FIG. 16, the system includes at least one Ethernet path, and in each Ethernet path, one apparatus for determining path congestion in the embodiment as the ingress node 110, at least one apparatus for determining path congestion in the embodiment as the intermediate node 120 (intermediate node 1, intermediate node 2, . . . , intermediate node N) is included, and one apparatus for determining path congestion in the embodiment as the egress node 130 is included.

As shown in FIG. 16, the system for determining path congestion provided by the embodiment of the present disclosure may receive a pre-congestion status indication packet through the ingress node 1610 directly, and notify an application function entity AF 1650 of performing admission control.

Figure 17:
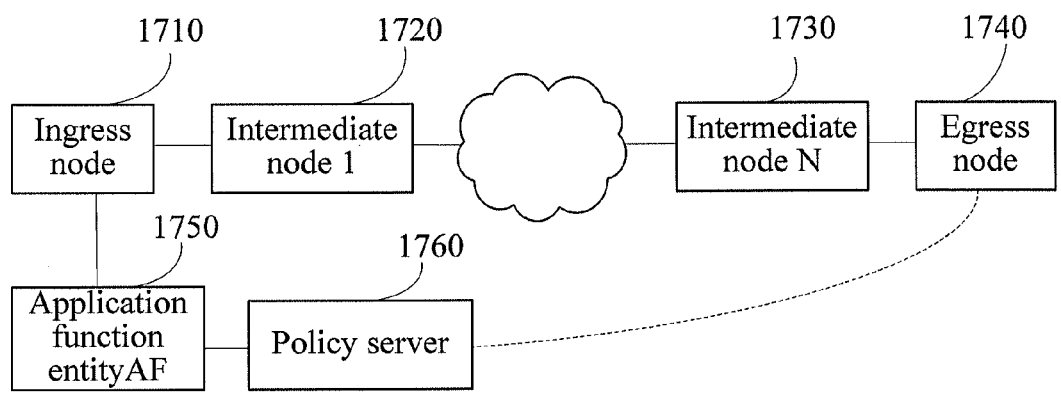
FIG. 17 is a schematic diagram of another system according to an embodiment of the present disclosure.

As shown in FIG. 17, the system may include one or more policy servers 1760, which are configured to receive a pre-congestion status indication packet and notify an application function 1750 of performing admission control.

Figure 14:
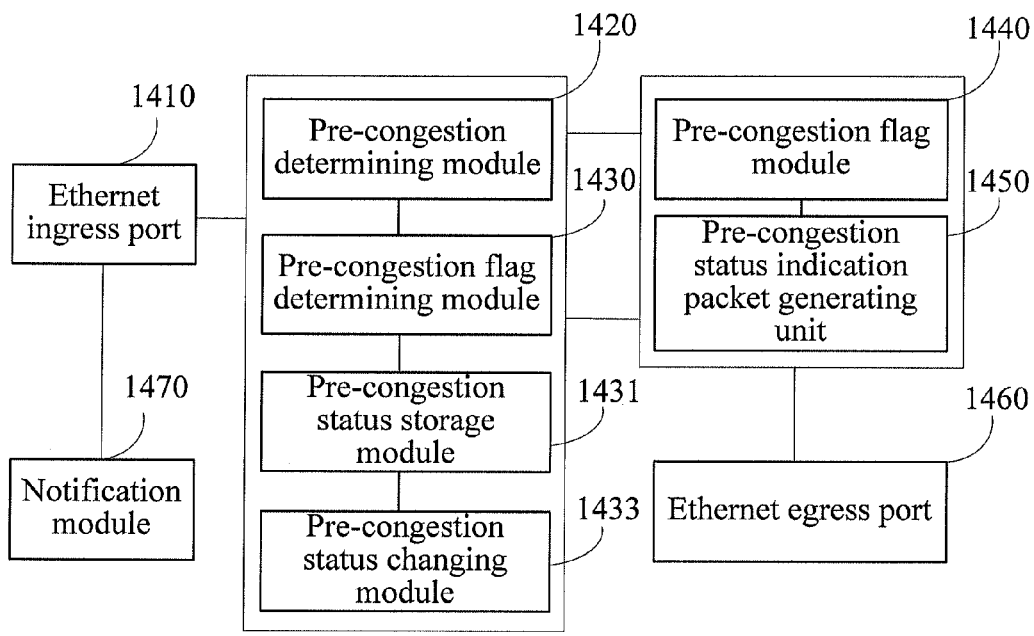
FIG. 14 is a schematic diagram of a determining apparatus according to an embodiment of the present disclosure.

It is well-known for an ordinary person skilled in the art that, functions corresponding to the ingress node 110, the intermediate node 120, and the egress node 130 in the embodiments may be integrated on a physical device, which plays different roles and uses different functions for different Ethernet paths, Therefore, the embodiment further provides an apparatus for determining path congestion, which integrates functions corresponding to an ingress node 110, an intermediate node 120, and an egress node 130. As shown in FIG. 14, the apparatus specifically includes the following:

an Ethernet ingress port 1410, configured to receive an Ethernet packet;

a pre-congestion determining module 1420, configured to determine whether pre-congestion occurs in an Ethernet node after the Ethernet packet is received;

a pre-congestion flag determining module 1430, configured to determine whether a pre-congestion flag is carried in the Ethernet packet after the Ethernet ingress port 1410 receives the Ethernet packet;

a pre-congestion flag module 1440, configured to set the pre-congestion flag in the Ethernet packet when the pre-congestion determining module 1420 determines that the pre-congestion occurs in an ingress node 110 or in an intermediate node 120 when the apparatus is the ingress node 110 or the intermediate node 120 in the path;

an Ethernet egress port 1460, configured to send the Ethernet packet when the apparatus is the ingress node 110 or the intermediate node 120 in the Ethernet path;

the Ethernet egress port 1460, further configured to forward the Ethernet packet when the pre-congestion determining module 1420 determines that the pre-congestion does not occur in the ingress node 110 or in the intermediate node 120 when the apparatus is the ingress node 110 or the intermediate node 120 in the path;

a pre-congestion status storage module 1431, configured to store a pre-congestion status of the Ethernet path when the apparatus is an egress node 130 in the path;

a pre-congestion status changing module 1433, configured to query the pre-congestion status stored in the pre-congestion status storage module 1431, determine whether to change a current pre-congestion status, and change the current pre-congestion status when it is determined that the current pre-congestion status needs to be changed; and a pre-congestion status indication packet generating unit 1450, configured to generate a pre-congestion status indication packet when the pre-congestion status changing module 1433 determines that the egress node 130 changes the current pre-congestion status when the apparatus is the egress node 130 in the path, where the pre-congestion status indication packet includes a path identifier.

When the apparatus is the egress node 130 in the path, the Ethernet egress port 1460 is further configured to send the pre-congestion status indication packet.

When the apparatus is the ingress node 110 in the path, the Ethernet ingress port 1410 is further configured to receive the pre-congestion status indication packet. Accordingly, as shown in FIG. 14, the apparatus further includes a notification module 1470, which is configured to notify an application function entity AF 150 of performing admission control after the Ethernet ingress port 1410 receives the pre-congestion status indication packet.

An embodiment of the present disclosure further provides a policy server, where the policy server is located in an Ethernet, including:

an Ethernet ingress port (1510), configured to receive a packet carrying pre-congestion information; and a notification module (1520), configured to notify an application function entity AF (150) of performing admission control after the Ethernet ingress port 1510 receives the packet carrying the pre-congestion information.

Through the above descriptions of the embodiments, an ordinary person skilled in the art may clearly understand that the present disclosure may be implemented by software on necessary universal hardware, and definitely may also be implemented by hardware. The hardware may be a computer or any computing device with a processor. Based on such understandings, the solution of the present disclosure may be substantially embodied in the form of a software product. The computer software product may be stored in a storage medium, for example, a ROM, a RAM, a magnetic disk, an optical disk and the like. The software product includes several instructions used to instruct computer equipment (for example, a personal computer, a server, or network equipment) to perform the method according to the embodiments of the present disclosure.

According to another embodiment of the disclosure, a method for processing path congestion is provided, which is applicable to a policy server (140) in an Ethernet, comprising:

receiving a packet carrying pre-congestion information, and obtaining the pre-congestion information of the Ethernet; and notifying an application function entity AF (150) of performing admission control.

According to another embodiment of the disclosure, a method for determining path congestion is provided, which is applicable to an Ethernet path, wherein an ingress node (110) or an intermediate node (120) in the Ethernet path receives an Ethernet packet; determines whether pre-congestion occurs in the node; and sets a pre-congestion flag in the Ethernet packet if the pre-congestion occurs, and sends the Ethernet packet.

Optional, the method further comprises: forwarding the Ethernet packet if the pre-congestion does not occur.

Optional, the setting the pre-congestion flag in the Ethernet packet comprises: setting a CFI field of an 802.1Q protocol as a first numeral value in a header of the Ethernet packet; or setting a priority field of an Ethernet 802.1Q protocol as a second numeral value in the header of the Ethernet packet.

Optional, the method further comprises: receiving, by the ingress node (110), a packet carrying pre-congestion information, and obtaining the pre-congestion information; and notifying an application function entity AF (150) of performing admission control.

Optional, method further comprising: determining, by the intermediate node (120), whether the pre-congestion flag is carried in the Ethernet packet after the Ethernet packet is received, wherein the determining whether the pre-congestion occurs in the intermediate node (120) and determining whether the pre-congestion flag is carried in the Ethernet packet specifically comprises: determining whether the pre-congestion occurs in the intermediate node (120), and forwarding the Ethernet packet if the pre-congestion does not occur in the intermediate node (120); determining whether the pre-congestion flag is carried in the Ethernet packet if the pre-congestion occurs to the intermediate node (120); forwarding the Ethernet packet if the pre-congestion flag is carried in the Ethernet packet; and setting the pre-congestion flag in the Ethernet packet if the pre-congestion flag is not carried in the Ethernet packet; or determining whether the pre-congestion flag is carried in the Ethernet packet, and forwarding the Ethernet packet if the pre-congestion flag is carried in the Ethernet packet; and determining whether the pre-congestion occurs in the intermediate node (120) if the pre-congestion flag is not carried in the Ethernet packet.

According to another embodiment of the disclosure, an apparatus for determining path congestion is provided, wherein the apparatus is located in an Ethernet path, comprising: an Ethernet ingress port (1110, 1210, 1310, 1410), configured to receive an Ethernet packet; a pre-congestion determining module (1120, 1220, 1320, 1420), configured to determine whether pre-congestion occurs in the apparatus for determining path congestion after the Ethernet ingress port (1110, 1210, 1310, 1410) receives the Ethernet packet; and a pre-congestion flag determining module (1230, 1330, 1430), configured to determine whether an pre-congestion flag is carried in the Ethernet packet after the Ethernet ingress port (1110, 1210, 1310, 1410) receives the Ethernet packet.

Optional, when the apparatus for determining path congestion is located in an ingress node (110) or an intermediate node (120) in the Ethernet path, the apparatus further comprises: a pre-congestion flag module (1130, 1250, 1440), configured to set the pre-congestion flag in the Ethernet packet when the pre-congestion determining module (1120, 1220, 1320, 1420) determines that the pre-congestion occurs in the ingress node (110) or in the intermediate node (120);

and an Ethernet egress port (1140, 1240, 1340, 1460), configured to send the Ethernet packet.

Optional, when the apparatus is the ingress node (110) or the intermediate node (120) in the Ethernet path, the Ethernet egress port (1140, 1240, 1340, 1460) is further configured to forward the Ethernet packet when the pre-congestion determining module (1120, 1220, 1320, 1420) determines that the pre-congestion does not occur in the ingress node (110) or the intermediate node (120).

Optional, when the apparatus is the ingress node (110) in the Ethernet path, the Ethernet ingress port (1110, 1210, 1310, 1410) is further configured to receive the pre-congestion status indication packet, and the apparatus further comprises a notification module (1150, 1470), which is configured to notify an application function entity AF (150) of performing admission control after the Ethernet ingress port (1110, 1210, 1310, 1410) receives the pre-congestion status indication packet.

According to another embodiment of the disclosure, a policy server is provided, wherein the policy server is located in an Ethernet, comprising: an Ethernet ingress port (1510), configured to receive a packet carrying pre-congestion information; and a notification module (1520), configured to notify an application function entity AF (150) of performing admission control after the Ethernet ingress port (1510) receives the packet carrying the pre-congestion information.

The above is merely exemplary embodiments of the present disclosure, but the protection scope of the present disclosure is not limited thereto. Any modification, equivalent replacement, or improvement made without departing from the spirit and principle of the present disclosure should fall within the protection scope of the present disclosure.

What is claimed is:

1. A method for determining path congestion of an Ethernet path, comprising:
   receiving, by an egress node in the Ethernet path, an Ethernet packet;
   determining, by the egress node, whether the egress node changes a current pre-congestion status, wherein the current pre-congestion status comprises a status that a pre-congestion occurs and a status that the pre-congestion does not occur;
   generating a pre-congestion status indication packet when the current pre-congestion status is changed, wherein the pre-congestion status indication packet comprises a path identifier of the Ethernet path, wherein the path identifier is a virtual local area network identifier (VLAN ID); and
   sending the pre-congestion status indication packet to an ingress node or a policy server, so that the ingress node or the policy server performs admission control.

2. The method according to claim 1, wherein determining whether the egress node changes the current pre-congestion status comprises: determining whether the pre-congestion occurs in the egress node and whether a pre-congestion flag is carried in the Ethernet packet.

3. The method according to claim 2, wherein determining whether the pre-congestion occurs in the egress node and whether the pre-congestion flag is carried in the Ethernet packet comprises:
   determining whether the pre-congestion occurs in the egress node and whether the pre-congestion flag is carried in the Ethernet packet when the current pre-congestion status is the status that the pre-congestion does not occur; and changing the current pre-congestion status from the status that pre-congestion does not occur into the status that current pre-congestion occurs when the pre-congestion occurs in the egress node and the pre-congestion flag is carried in the Ethernet packet, wherein the pre-congestion status indication packet indicates that the pre-congestion occurs in the Ethernet path; and determining whether the pre-congestion occurs in the egress node and whether the pre-congestion flag is carried in the Ethernet packet when the current pre-congestion status is the status that the pre-congestion occurs; and changing the current pre-congestion status from the status that pre-congestion occurs into the status that the pre-congestion does not occur when the pre-congestion does not occur in the egress node and the pre-congestion flag is not carried in the Ethernet packet, wherein the pre-congestion status indication packet indicates that the pre-congestion does not occur in the Ethernet path.

4. The method according to claim 3, wherein sending the pre-congestion status indication packet to the ingress node or the policy server comprises that:

the pre-congestion status indication packet is an 802.1Q protocol packet when the pre-congestion status indication packet is sent to the ingress node; and the pre-congestion status indication packet is the 802.1Q protocol packet or a common open policy service (COPS) protocol packet when the pre-congestion status indication packet is sent to the policy server, wherein a virtual Ethernet identifier in the 802.1 Q protocol packet is a management virtual local area network identifier.

5. The method according to claim 3, wherein when the pre-congestion does not occur in the egress node and the pre-congestion flag is not carried in the Ethernet packet, the Ethernet packet is forwarded.

6. The method according to claim 3, wherein when the pre-congestion flag is carried in the Ethernet packet, the pre-congestion flag is deleted, and the Ethernet packet is forwarded.

7. An apparatus for determining path congestion, wherein the apparatus is located in an egress node in an Ethernet path, comprising:

an Ethernet ingress port, configured to receive an Ethernet packet;

a pre-congestion determining module, configured to determine whether pre-congestion occurs in the apparatus for determining path congestion after the Ethernet ingress port receives the Ethernet packet;

a pre-congestion flag determining module, configured to determine whether an pre-congestion flag is carried in the Ethernet packet after the Ethernet ingress port receives the Ethernet packet;

a pre-congestion status storage module, configured to store a pre-congestion status of the Ethernet path, the current pre-congestion status comprising a status that a pre-congestion occurs and a status that the pre-congestion does not occur;

a pre-congestion status changing module, configured to query the pre-congestion status stored in the pre-congestion status storage module, determine whether to change the pre-congestion status based on the determination of the pre-congestion determining module and the determination of the pre-congestion flag determining module, and change the pre-congestion status;

a pre-congestion status indication packet generating unit, configured to generate a pre-congestion status indication packet when the pre-congestion status changing module changes the pre-congestion status, wherein the pre-congestion status indication packet comprises a path identifier of the Ethernet path, wherein the path identifier is a virtual local area network identifier (VLAN ID); and an Ethernet egress port, configured to send the pre-congestion status indication packet to an ingress node or a policy server.

8. A non-transitory computer-readable medium having computer-executable instructions stored thereon which, when executed by a computer, cause the computer to determine path congestion of an Ethernet path, the computer-executable instructions comprising:

instructions for receiving an Ethernet packet;

instructions for determining whether an egress node changes a current pre-congestion status, wherein the current pre-congestion status comprises a status that a pre-congestion occurs and a status that the pre-congestion does not occur;

instructions for generating a pre-congestion status indication packet when the current pre-congestion status is changed, wherein the pre-congestion status indication packet comprises a path identifier of the Ethernet path, wherein the path identifier is a virtual local area network identifier (VLAN ID); and instructions for sending the pre-congestion status indication packet to an ingress node or a policy server.

9. The non-transitory computer-readable medium according to claim 8, wherein the computer-executable instructions further comprises:

instructions for forwarding the Ethernet packet when the pre-congestion does not occur in the egress node and the pre-congestion flag is not carried in the Ethernet packet.

10. An apparatus for determining path congestion, wherein the apparatus is located in an egress node in an Ethernet path, comprising:

an Ethernet ingress port, configured to receive an Ethernet packet;

a pre-congestion determining module, configured to determine whether pre-congestion occurs in the apparatus for determining path congestion after the Ethernet ingress port receives the Ethernet packet;

a pre-congestion status storage module, configured to store a pre-congestion status of the Ethernet path, the current pre-congestion status comprising a status that a pre-congestion occurs and a status that the pre-congestion does not occur;

a pre-congestion status changing module, configured to query the pre-congestion status stored in the pre-congestion status storage module, determine whether to change the pre-congestion status based on the determination of the pre-congestion determining module, and change the pre-congestion status;

a pre-congestion status indication packet generating unit, configured to generate a pre-congestion status indication packet when the pre-congestion status changing module changes the pre-congestion status, wherein the pre-congestion status indication packet comprises a path identifier of the Ethernet path, wherein the path identifier is a virtual local area network identifier (VLAN ID); and an Ethernet egress port, configured to send the pre-congestion status indication packet to an ingress node or a policy server.

* * * * *